US011474917B2

United States Patent
Zhang et al.

(10) Patent No.: US 11,474,917 B2
(45) Date of Patent: Oct. 18, 2022

(54) FAILURE SHIELD

(71) Applicant: Hewlett-Packard Development Company, L.P., Spring, TX (US)

(72) Inventors: Xinwei Zhang, Fort Collins, CO (US); Zachary Tahenakos, Fort Collins, CO (US); Daniel Bungert, Fort Collins, CO (US); Daryl T. Poe, Fort Collins, CO (US); Timothy J. Freese, Fort Collins, CO (US); Matthieu Clemenceau, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/042,974

(22) PCT Filed: Apr. 27, 2018

(86) PCT No.: PCT/US2018/029816
§ 371 (c)(1),
(2) Date: Sep. 29, 2020

(87) PCT Pub. No.: WO2019/209314
PCT Pub. Date: Oct. 31, 2019

(65) Prior Publication Data
US 2021/0034480 A1    Feb. 4, 2021

(51) Int. Cl.
*G06F 11/20* (2006.01)
*G06F 11/14* (2006.01)
*G06T 1/20* (2006.01)

(52) U.S. Cl.
CPC ...... *G06F 11/2023* (2013.01); *G06F 11/1438* (2013.01); *G06F 11/1482* (2013.01);
(Continued)

(58) Field of Classification Search
CPC .. G06F 11/142; G06F 11/1428; G06F 11/143; G06F 11/1438; G06F 11/1482;
(Continued)

(56) References Cited

U.S. PATENT DOCUMENTS 7,633,505 B1   12/2009   Kelleher
8,629,878 B2   1/2014    Jackson
(Continued)

FOREIGN PATENT DOCUMENTS

EP    3044754    1/2018

OTHER PUBLICATIONS

Mvanier, "Getting Started", Jan. 10, 2014, OpenGL Wiki, Retrieved from Google: <https://www.khronos.org/opengl/wiki_opengl/index.php?title=Getting_Started&oldid=11420> (Year: 2014).*

*Primary Examiner* — Bryce P Bonzo
*Assistant Examiner* — Albert Li
(74) *Attorney, Agent, or Firm* — Brooks Cameron & Huebsch PLLC

(57) ABSTRACT

An example graphics system can include a first portion including a graphics driver and graphics hardware and a second portion communicatively coupled to the first portion. The second portion can include a display system communicatively coupled to a GUI application and a shim layer to shield the second portion from failure responsive to failure of the first portion.

14 Claims, 3 Drawing Sheets

(52) U.S. Cl.
CPC .......... *G06F 2201/82* (2013.01); *G06T 1/20* (2013.01); *G06T 2200/24* (2013.01)

(58) Field of Classification Search
CPC .......... G06F 11/2023; G06F 11/2028; G06F 11/1658; G06F 11/203; G06T 1/20; G06T 2200/24; G06T 2204/28; G09G 2330/08; G09G 5/006; G09G 5/363; G09G 2330/12

See application file for complete search history.

(56) References Cited

U.S. PATENT DOCUMENTS

| | | | |
|---|---|---|---|
| 8,813,099 | B2 | 8/2014 | Qiarre et al. |
| 8,970,603 | B2 | 3/2015 | Post et al. |
| 9,672,087 | B2 | 6/2017 | Lee et al. |
| 2005/0024366 | A1* | 2/2005 | Lefebvre .............. G06T 15/00 345/506 |
| 2007/0046680 | A1* | 3/2007 | Hedrick ................ G01C 23/00 345/503 |
| 2011/0239059 | A1 | 9/2011 | Sugimoto |
| 2012/0081355 | A1* | 4/2012 | Post ...................... G06T 15/005 345/419 |
| 2013/0147822 | A1 | 6/2013 | Yu et al. |
| 2013/0176318 | A1 | 7/2013 | Dunn et al. |
| 2014/0146062 | A1* | 5/2014 | Kiel ...................... G06F 11/362 345/522 |
| 2014/0267328 | A1* | 9/2014 | Banack .................... G06T 1/20 345/522 |
| 2015/0015588 | A1* | 1/2015 | Guy ......................... G06F 3/14 345/501 |
| 2015/0235338 | A1* | 8/2015 | Alla ....................... G06F 9/445 345/522 |
| 2016/0055613 | A1* | 2/2016 | Ai .......................... G06T 11/00 345/418 |
| 2017/0075777 | A1* | 3/2017 | Dunn .................. G06F 11/2028 |
| 2017/0293510 | A1* | 10/2017 | Memon ............... G06F 11/0751 |
| 2018/0295261 | A1* | 10/2018 | Beckert .................. H04N 7/181 |
| 2019/0114132 | A1* | 4/2019 | Chu ....................... G06F 3/1423 |

* cited by examiner

FAILURE SHIELD

BACKGROUND

A graphical user interface (GUI) is a type of user interface that allows users to interact with electronic devices through graphical icons and visual indicators such as secondary notation, instead of text-based user interfaces, typed command labels or text navigation. A GUI can be coupled to computer graphics hardware.

DETAILED DESCRIPTION

Graphics systems can provide an interface between display hardware components and software components and a GUI application that has an associated GUI that may be housed in a hardware component such as a thin client, liquid crystal display (LCD), light-emitting diode (LED), organic LED (OLED), or cathode ray tube (CRT), among others. The GUI application can be associated with and communicate with a display, with which a user interacts (e.g., a screen). A graphics system, for instance, can accept commands and data and generate signals to make the GUI application illustrate desired text and/or images via the display.

Graphics systems can be broken by associated hardware failures. In contrast to other devices such as a keyboard or a mouse, recovery from hardware failures can occur without a user noticing the failure. However, graphics systems including GUI applications may not survive a hardware failure or allow a user to resume current work. For instance, when a hardware component of a graphics system crashes, everything associated with the graphics system can be inoperable. A user may reboot, but their work done via a GUI application is lost. Put another way, the user may not be able to resume work at a point in time right before the hardware failure.

In some approaches, virtual desktops are used to create a fixed, virtual display buffer in memory available via their own client over a network. Such approaches provide persistence, but do not address a response to a hardware failure as described with respect to the present disclosure because they do not communicate with hardware. Further, some examples of the present disclosure allow for a GUI application that is not interrupted by associated hardware failure. For instance, a portion of a graphics system can be shielded from failure such that responsive to an associated hardware failure, a user can resume his or her work with reduced interruption as compared to other approaches.

Some other approaches include detecting a graphics processing unit (GPU) reset and restarting a 3-dimensional (3D) rendering process for a virtual machine (VM) in response. Examples of the present disclosure can shield a portion of a graphics system from failure responsive to hardware, firmware, and/or software component failures. For instance, a portion of the graphics system can be shielded from failure responsive to a failure other than a GPU reset. For example, responsive to a graphical client application misbehaving and causing software associated with the graphics system to fail, a first portion of a graphics system may fail, but a second portion of the graphics portion that has been shielded from failure can continue to function with reduced interruption.

Figure 1:
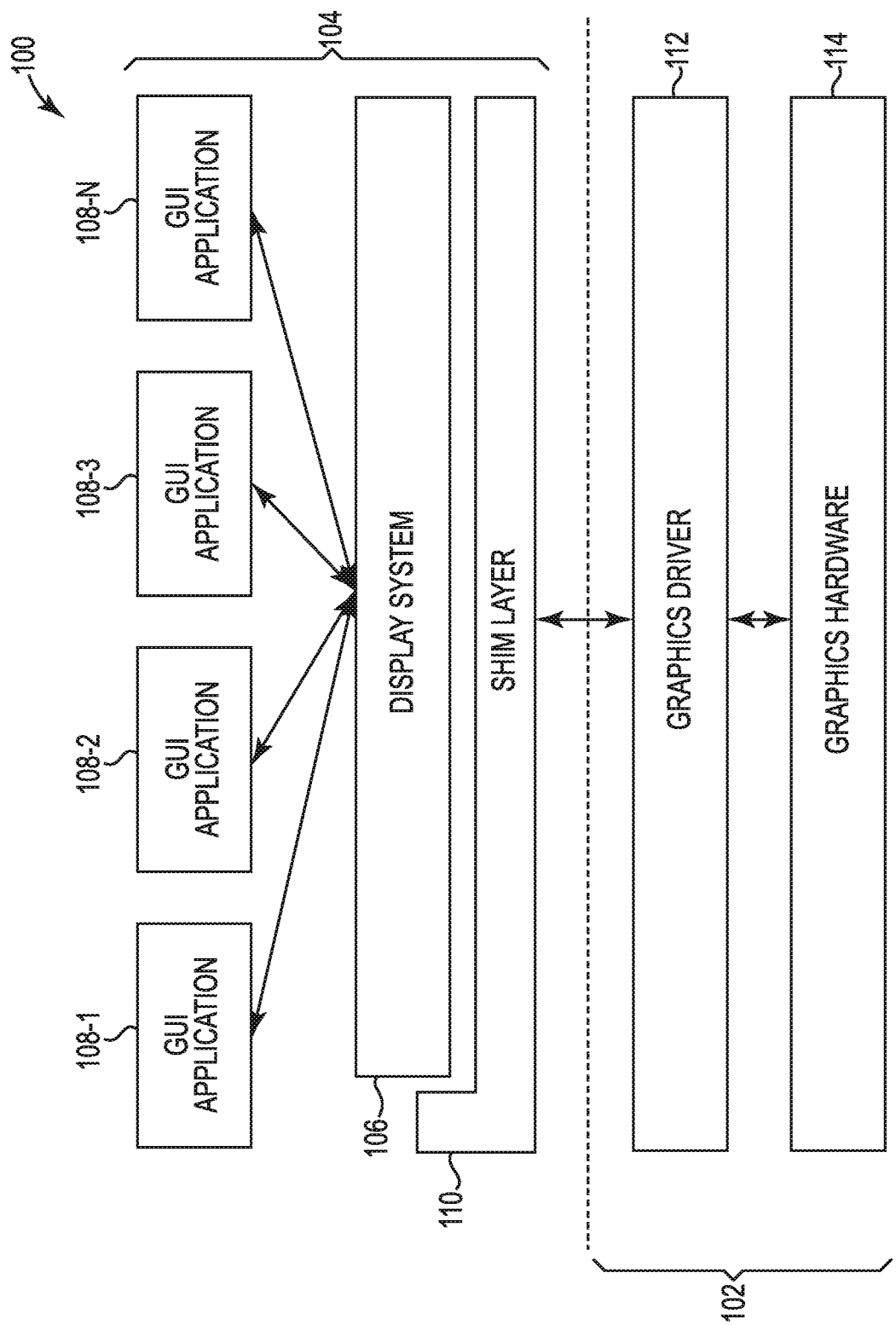
FIG. 1 illustrates a diagram of a graphics system according to an example.

FIG. 1 illustrates a diagram of a graphics system 100 according to an example. Graphics system 100 can be a Linux graphics system or an Android graphics system, among others. Examples of the present disclosure are not limited to a particular graphics system.

Graphics system 100 can include a first portion 102 and a second portion 104. First portion 102 can include a graphics driver 112 and graphics hardware 114. Graphics driver 112 can include an application that controls the graphics hardware 114 and provide an application programming interface (API) to an associated operating system to access display resources. In some examples, graphics driver 112 can include firmware that runs on graphics hardware 114 and/or a kernel driver that runs in an operating system kernel (e.g., a Linux kernel). Graphics hardware 114 can include, for instance a device such as a monitor that connects to an associated computing device.

Second portion 104 can be communicatively coupled to first portion 102 and can include a display system 106 communicatively coupled to a GUI application 108-1, 108-2, 108-3, . . . , 108-N (herein after referred to collectively as GUI applications 108) and a shim layer 110. As used herein, "communicatively coupled" can include coupled via various wired and/or wireless connections between devices such that data can be transferred in various directions between the devices. The coupling need not be a direct connection, and in some examples, can be an indirect connection. While four GUI applications 108 are illustrated in FIG. 1, more or fewer GUI applications may be present in graphics system 100. Display system 106 can include a daemon that manages and coordinates GUI application display aspects. In some examples, display system 106 can be part of the kernel.

Graphics system 100 can be separated into first portion 102 and second portion 104 in order to survive associated hardware, firmware, or software failures and restore to a GUI application 108 what a user was working on with reduced interruption (e.g., "seamlessly"). For instance, responsive to a failure of first portion 102, shim layer 110 can shield second portion 104 from failure. Failure can include glitches in software components, hardware components, and/or firmware components associated with graphics system 100. For instance, in some examples, failure of first portion 102 includes failure of graphics hardware 114. Failures, in some instances, can include a failure of a component associated with graphics system 100 that may destroy a display of a GUI application 108 communicatively coupled to graphics system 100 if the GUI application 108 is not shielded.

Shielding second portion 104 can prevent a user losing work because of a failure associated with a GUI application 108 on which he or she is working. For instance, a user may avoid restarting a GUI application and re-performing lost work because their GUI application 108 (and hence their work) has been shielded from failure. Work can be resumed with reduced interruption. Reduced interruption can include downtime to restore the display of GUI application 108 to a state prior to the failure, but without complete system shutdown and restart (and lost work).

In some examples, second portion 104 can include drivers to reset failed graphics hardware 114. For instance, when graphics hardware 114 fails, second portion 104 maintains an internal buffer to keep second portion 104 functioning.

Responsive to a failure of graphics hardware 114, second portion 104 can reset the failed graphics hardware 114, and because second portion 104 is functioning, first portion 102 can rejoin graphics hardware 114 upon reset, a display can return, and a user can go back to work without loss of words or images on his or her display. Put another way, second portion 104 can store display information associated with a GUI application 108 and display the stored display information responsive to restoration of the failed first portion 102. That stored display information can be displayed to a user upon restoration of failed first portion 102 (e.g., graphics hardware 112 failure).

Figure 2:
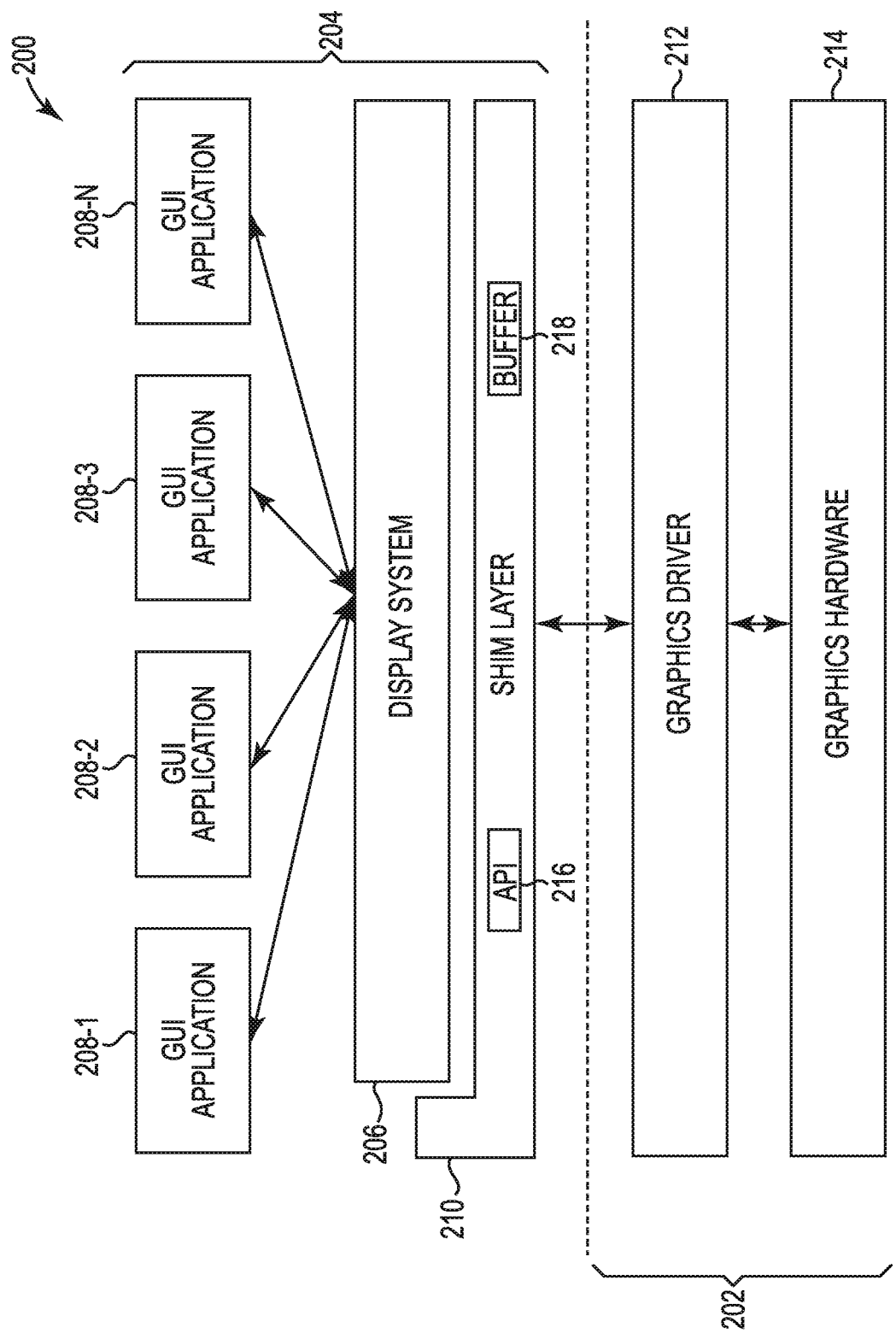
FIG. 2 illustrates another diagram of a graphics system according to an example.

FIG. 2 illustrates another diagram of a graphics system 200 according to an example. Graphics system 200 includes first portion 202, which includes graphics driver 212 and graphics hardware 214, and second portion 204 communicatively coupled to first portion 202. Second portion 202 can include display system 206 communicatively coupled to a GUI application 208 and shim layer 210 including API 216 and buffer 218. Buffer 218 is internal to shim layer 210 and graphics system 200 and participates in shielding second portion 204. Buffer 204 can be where configurations and data are stored. These configurations and data can be used to restore graphics hardware 21 and graphics hardware 214 to a known working state responsive to a failure. API 216 increases a robustness of second portion 204 in some examples. For instance, API 216 can be used to retrieve device configuration and/or setup information from buffer 204 and apply that information to graphics hardware 214.

In some examples, shim layer 210, using API 216 and buffer 218, can shield second portion 204 from failure responsive to failure of graphics hardware 214 and restore a display to GUI application 208 to a state prior to the failure. The restoration of the display can be responsive to restoration of the failed graphics hardware 214 in some examples. For instance, if graphics hardware 214 or some portion thereof fails, first portion 202 can be rebooted and/or restarted while second portion 204 remains intact. Second portion 204 can perform inquiries with respect to first portion 202 requesting information about whether first portion 202 (e.g., failed graphics hardware 214) has been restored. Once first portion 202 has been restored, GUI application 208 and second portion 204 can be reestablished, allowing a user to pick up where he or she left off working on a display associated with GUI application 208.

In some examples, shim layer 210 can shield second portion 204 from failure responsive to failure of a first portion of graphics hardware 214. For instance, second portion 204 including GUI application 208 doesn't lose information when a portion or all of graphics hardware 214 fails. In some instances, when a portion (e.g., the first portion) of graphics hardware 214 fails, GUI application 208 can be restored to a state prior to the failure using a portion (e.g., a second portion) of graphics hardware 214 that did not fail.

In some examples, second portion 204 of graphics system 200 can be considered "user side" or "client side" such that components of second portion 204 communicate with a user of graphics system 200 and maintain an internal buffer 218. First portion 202 of graphics system 200 can be considered "hardware side" such that components of first portion 202 communicate with hardware associated with graphics system 200 and draw pixels for a display (e.g., create a display) associated with a GUI application 208 associated with graphics system 200.

In some instances, graphic system 200 can include a plurality of device drivers to facilitate communication between graphics hardware 214 and an associated operating system. For instance, communication between graphics hardware 214 and the operating system can be analyzed, and a determination can be made as to where a buffer is placed to shield second portion 204.

Figure 3:
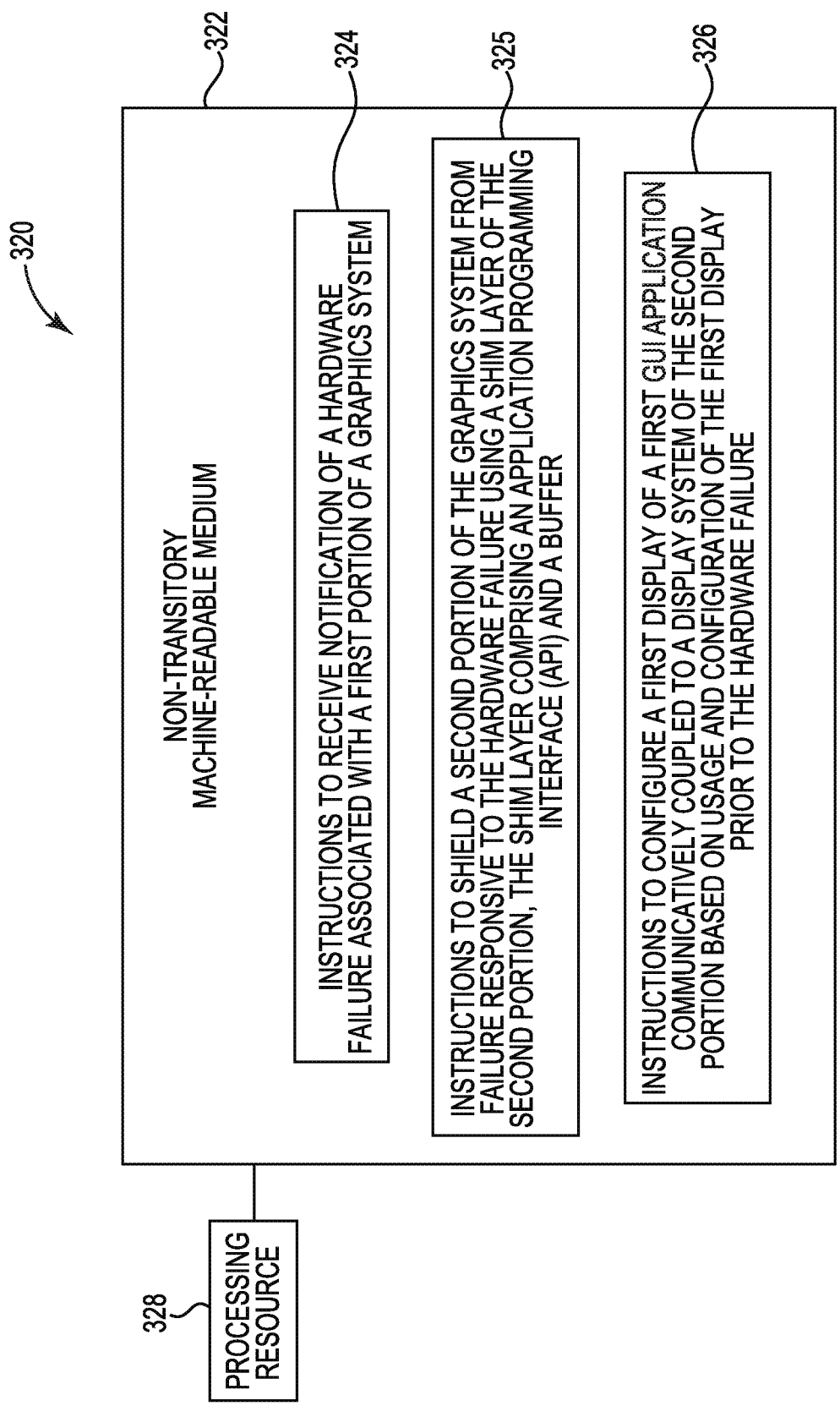
FIG. 3 illustrates a diagram of a computing system including a processing resource, a memory resource, and instructions according to an example.

FIG. 3 illustrates a diagram of a computing system 320 including a processing resource 328, a non-transitory machine-readable medium 322, and instructions 324, 325, 326 according to an example. For instance, system 320 can be a computing device in some examples and can include a processing resource 328. System 320 can further include a non-transitory MRM 322, on which may be stored instructions, such as instructions 324, 325, 326. Although the following descriptions refer to a processing resource and a memory resource, the descriptions may also apply to a system with multiple processing resources and multiple memory resources. In such examples, the instructions 324, 325, 326 may be distributed (e.g., stored) across multiple non-transitory MRMs and the instructions may be distributed (e.g., executed by) across multiple processing resources.

Non-transitory MRM 322 may be electronic, magnetic, optical, or other physical storage device that stores executable instructions. Thus, non-transitory MRM 322 may be, for example, Random Access Memory (RAM), an Electrically-Erasable Programmable Read-Only Memory (EEPROM), a storage drive, an optical disc, and the like on-transitory MRM 322 may be disposed within system 320, as shown in FIG. 3. In this example, the executable instructions 324, 325, 326 may be "installed" on the device. Additionally and/or alternatively, non-transitory MRM 322 can be a portable, external or remote storage medium, for example, that allows system 320 to download the instructions 324, 325, 326 from the portable/external/remote storage medium. In this situation, the executable instructions may be part of an "installation package". As described herein, non-transitory MRM 322 can be encoded with executable instructions for shielding a portion of a graphics system from failure.

Instructions 324, when executed by a processing resource such as processing resource 328, can include instructions to receive notification of a hardware failure associated with a first portion of a graphics system. The failure, for instance, can include crashing, stopping, or glitching, among other failures that may affect other portions of the graphics system.

Instructions 325, when executed by a processing resource such as processing resource 328, can include instructions to shield a second portion of the graphics system from failure responsive to the hardware failure using a shim layer of the second portion. For instance, the graphics system can be split into the first portion and the second portion. Hardware of the first portion can crash, stop, or start while the second portion can reconnect to other available hardware, allowing a user to resume his or her work on a display associated with a GUI application with reduced interruptions. Put another way, shielding the second portion can include connecting the second portion to available functioning hardware different than the failed hardware.

In some instances, the shim layer can include an API and a buffer. The buffer can be created based on analysis of communication between the first portion and the second portion or between modules within or between the first portion and the second portion. The modules can include a block of computer code and/or data coupled together to perform a particular function. In some instances, communication between modules can be analyzed, and a determination can be made as to where a buffer is placed to shield the second portion. In some instances, responsive to a portion of the modules failing and restarting, a different portion of the modules can attempt to reestablish a connection with the second portion via the API, and the different portion of the modules and the second portion of the graphics system can resume operation with reduced interruption of a display for a user. In some instances, the API can be created based on the analysis of communication, as well.

Instructions 326, when executed by a processing resource such as processing resource 328, can include instructions to configure a first GUI application communicatively coupled to a display system of the second portion based on usage and configuration of the first display prior to the hardware failure. For instance, some examples of the present disclosure can determine, based on a current configuration of a display and a usage of the display, a more efficient layout of the display. The first GUI application can be configured such that upon restart, the display associated with the GUI application displays the new, more efficient layout. In some instances, a second display of the first GUI application can be configured based on usage and configuration of the first display prior to the hardware failure. For example, the first GUI application can be configured such that more than one display can be organized in a more efficient manner as compared to previous arrangements. In some examples, upon recovery from a hardware failure, the first and the second displays can be presented in the more efficient layout. In some instances, the more efficient layout can be adjusted or rejected based on input by a user. Options for different layouts may be available in some examples.

In some instances, a second display associated with a second GUI application communicatively coupled to the display system can be configured based on usage and configuration of the second display prior to the hardware failure. For example, more than one GUI application of a graphics system can be configured for efficiency. The newly configured first and second GUI applications can be displayed responsive to the hardware failure in some instances. In some examples, the first and/or the second GUI applications can be configured dynamically, such that they are updated in real time with or without user input.

In some examples, different displays may be connected at different times to the same GUI application. In such an example, when connections are changed (e.g., to different size display, different type display), a more efficient layout can be displayed based on previous user display configurations, the different sizes or types of displays, user usage, etc. Put another way, if a user changes displays, the second portion of the graphics system (e.g., the buffer of the second portion) can remember a previous configuration of a display and shift the same configuration, or create a new configuration to the different, newly connected display. Because the second portion of the graphics system is shielded from failure, these display configurations can be stored without being lost due to a hardware failure.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A graphics system, comprising:
   a first portion comprising a graphics driver and graphics hardware; and
   a second portion communicatively coupled to the first portion and comprising:
   a display system communicatively coupled to a GUI application, the display system including a daemon to manage and coordinate a GUI application display aspect; and
   a shim layer to shield the second portion from failure responsive to a failure of the first portion, wherein shielding the second portion from the failure includes:
   preventing loss of work by connecting the second portion to a functioning hardware different from the graphics hardware; and
   responsive to restoration of the failed first portion, configuring a display of the GUI application communicatively coupled to the display system of the second portion, the display being configured in a different layout than a layout of the display prior to the failure, wherein the different layout is based on a usage and a configuration of the display prior to the failure.

2. The graphics system of claim 1, wherein the shim layer to shield the second portion from failure comprises the shim layer to shield the second portion from failure responsive to failure of the graphics hardware of the first portion.

3. The graphics system of claim 2, the second portion further comprising drivers to reset the failed graphics hardware responsive to the failure.

4. The graphics system of claim 1, further comprising the second portion to:
   store display information associated with the GUI application; and
   display the stored display information responsive to restoration of the failed first portion.

5. The graphics system of claim 1, further comprising a Linux graphics system.

6. A non-transitory machine-readable medium storing instructions executable by a processing resource to cause a computing system to:
   receive notification of a hardware failure associated with a first portion of a graphics system;
   shield a second portion of the graphics system from failure responsive to the hardware failure using a shim layer of the second portion, the shim layer comprising an application programming interface (API) and a buffer, wherein shielding the second portion from the failure includes preventing loss of work by connecting the second portion to a functioning hardware different from the failed hardware; and
   responsive to restoration of the failed hardware, configure a first display of a first GUI application communicatively coupled to a display system of the second portion, the display system including a daemon to manage and coordinate a GUI application display aspect, wherein the first display is configured in a different layout than a layout of the first display prior to the hardware failure, the different layout being based on a usage and a configuration of the first display prior to the hardware failure.

7. The medium of claim 6, further comprising instructions executable to:
analyze communication between the first portion and the second portion; and
create the buffer based on the analysis.

8. The medium of claim 6, further comprising instructions executable to configure a second display of a second GUI application communicatively coupled to the display system based on the usage and configuration of the second display prior to the hardware failure.

9. The medium of claim 6, further comprising instructions executable to configure a second display of the first GUI application communicatively coupled to the display system, wherein the second display is configured in a different display layout than the layout of the first display prior to the hardware failure, the different display layout being based on the usage and configuration of the first display prior to the hardware failure and based on a size and a type of the second display.

10. A graphics system, comprising:
a first portion comprising a graphics driver and graphics hardware; and
a second portion communicatively coupled to the first portion and comprising:
a display system communicatively coupled to a GUI application, the display system including a daemon to manage and coordinate a GUI application display aspect; and
a shim layer comprising an application programming interface (API) and a buffer, the shim layer to:
shield the second portion from failure responsive to a failure of the graphics hardware of the first portion, wherein shielding the second portion from the failure includes preventing loss of work by connecting the second portion to a functioning hardware different from the graphics hardware; and
responsive to restoration of the failed graphics hardware, configure a display of the GUI application communicatively coupled to the display system of the second portion, wherein the display is configured in a different layout than a layout of the display prior to the failure, the different layout being based on a usage and a configuration of the display prior to the failure.

11. The graphics system of claim 10, wherein the first portion is to:
communicate with hardware associated with the graphics system; and
draw pixels associated with the graphics system.

12. The graphics system of claim 10, wherein the second portion is to communicate with a user of the graphics system.

13. The graphics system of claim 10, further comprising a plurality of device drivers to facilitate communication between the graphics hardware and an associated operating system.

14. The graphics system of claim 10, further comprising the shim layer to:
shield the second portion from failure responsive to failure of a first portion of the graphics hardware; and
restore the GUI application using a second portion of the graphics hardware that did not fail.

\* \* \* \* \*